C. CHRISTENSEN.
SEAT FOR AGRICULTURAL IMPLEMENTS.
APPLICATION FILED OCT. 7, 1907.
957,411.
Patented May 10, 1910.
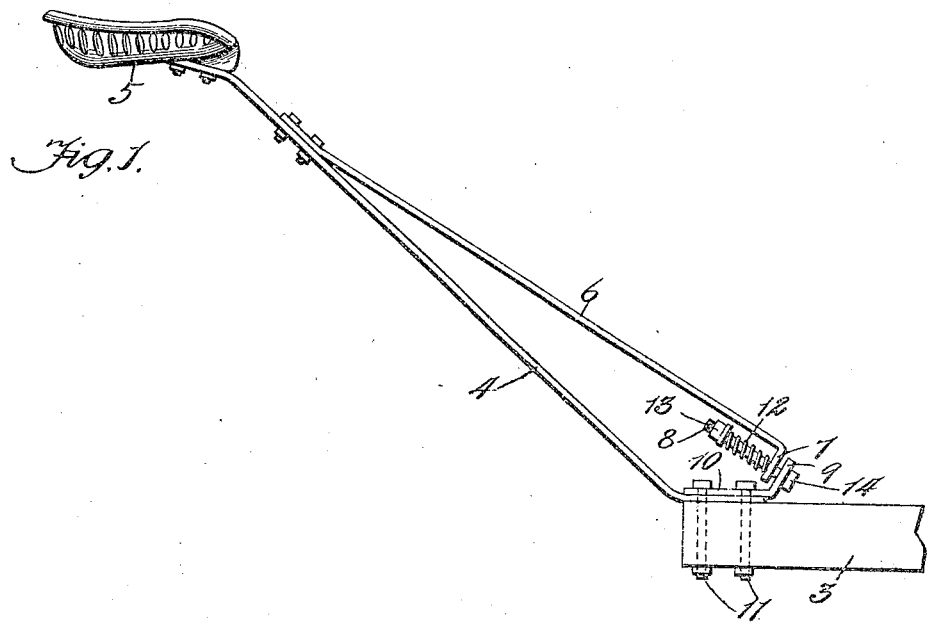
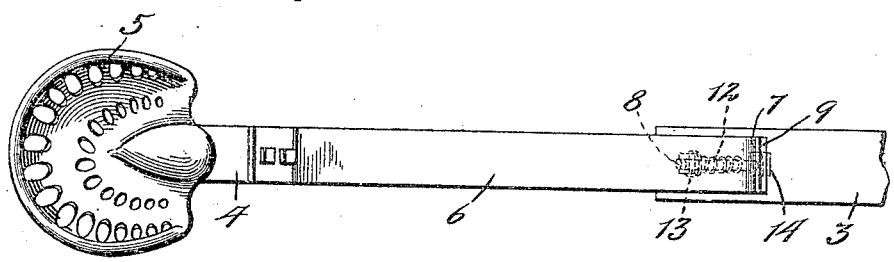

UNITED STATES PATENT OFFICE.

CARL CHRISTENSEN, OF BRADLEY, ILLINOIS, ASSIGNOR, BY MESNE ASSIGNMENTS, TO SEARS, ROEBUCK & COMPANY, OF CHICAGO, ILLINOIS, A CORPORATION OF NEW YORK.

SEAT FOR AGRICULTURAL IMPLEMENTS.

957,411.     Specification of Letters Patent.     Patented May 10, 1910.

Application filed October 7, 1907. Serial No. 396,249.

*To all whom it may concern:*

Be it known that I, CARL CHRISTENSEN, a citizen of the United States, residing at Bradley, in the county of Kankakee and State of Illinois, have invented certain new and useful Improvements in Seats for Agricultural Implements, of which the following is a specification, reference being had to the accompanying drawings.

My invention relates to seats for agricultural implements, and has for its object to provide a new and improved spring seat support. I accomplish this object as illustrated in the drawings and as hereinafter described.

That which I believe to be new is set forth in the claims.

In the accompanying drawings,—Figure 1 is a side elevation showing my improved seat support in position on the frame of an agricultural implement; and Fig. 2 is a plan view thereof.

Referring to the drawings,—3 indicates a portion of the frame of an implement.

4 indicates a strap or bar of steel, or other suitable material, which at its lower end is secured to the frame 3 and extends in an inclined position upward and backward therefrom,—the seat 5 being secured at its upper end. 6 indicates a second strap or bar of steel, or other suitable material, which at its upper end is secured to the upper surface of the strap 4 near its upper end and at its lower end is bent at an angle to form a lip 7, as shown in Fig. 1. Said lip is perforated to receive a bolt 8 which passes through it and through a lip 9 carried by a plate 10 secured upon the lower end of the strap 4, preferably by bolts 11 which secure said strap to the frame 3. The strap 6 is disposed at an angle to the strap 4,—its lower end being separated from the lower end portion of the strap 4 so that when the strap 4 is sprung downward under the weight of the driver the strap 6 is moved longitudinally to a greater or less extent in an outward direction,—*i. e.* away from the frame 3 in the direction of the seat 5.

12 indicates a spring mounted on the bolt 8 between the lip 7 and a nut 13 secured on the rear end of said bolt, as shown in Fig. 1. 14 indicates the head of the bolt, which is at the front side of the lip 9. It will be seen, therefore, that the weight on the seat 5 tends to press down the strap 4 and consequently acts through the strap 6 to compress the spring 12. The tension of said spring may be varied by adjusting the position of the nut 13 on the bolt 8. As the bolt 8 is substantially parallel with the upper member 6 of the seat-support, there is no tendency to bend said upper member 6 which acts simply to pull upon the spring 12 and compress the same. I thus secure not only the elastic action of the lower member or strap 4 of the seat support but also the compressing action upon the spring 12 through the upper member 6 of the seat support, the result being that a seat support is provided of very easy riding quality and of great strength. The seat support may be removed by simply removing the bolts 11.

That which I claim as my invention, and desire to secure by Letters Patent, is,—

1. A seat-support for implements, comprising a strap secured at its lower end to a suitable support, said strap being adapted to be deflected from its normal position by the weight of the rider, a second strap connected with and extending longitudinally of said first-mentioned strap, and a spring connected with said second strap and yieldingly holding the same when the seat-support is deflected from its normal position.

2. A seat-support for implements, comprising a strap secured at its lower end to a suitable support, said strap being adapted to be deflected from its normal position by the weight of the rider, a second strap connected with and extending longitudinally of said first-mentioned strap, and a coiled spring arranged substantially parallel with said second strap and yieldingly holding the same.

3. A seat-support for implements, comprising a flexible strap secured at its lower end to a suitable support, a second strap secured at its upper end to said first-mentioned strap and arranged at an angle thereto, a spring connected with the lower end portion of said second strap and adapted to be put under stress by longitudinal movement thereof, and means supporting said spring.

4. A seat-support for implements, comprising a strap secured at its lower end to a suitable support, a spring suitably supported at a distance from the lower portion of said strap, and a second strap secured to the upper portion of said first-mentioned strap and disposed at an angle thereto, said second strap operating under the weight of the rider to put said spring under stress.

5. A seat-support for implements, comprising a strap secured at its lower end upon a suitable support and extending upward in an inclined position from the point of its support, a second strap connected with the upper portion of said first-mentioned strap and disposed at an angle therewith, a bolt suitably supported at a distance from the lower portion of said first-mentioned strap, and a spring mounted on said bolt, said second strap acting under the weight of the rider to compress said spring.

6. A seat-support for implements, comprising a strap secured at its lower end upon a suitable support and extending upward in an inclined position, a second strap secured to the upper portion of said first-mentioned strap and extending at an angle therewith, said second strap having a lip at its lower end, a bolt supported adjacent to and parallel with the lower portion of said second strap, said bolt passing through said lip, a nut on said bolt, and a spring on said bolt between said nut and said lip.

7. A seat-support for implements, comprising a strap suitably supported at its lower end, a spring, and means yieldingly held at its lower end by said spring and fixedly connected at its upper end with said strap and movable longitudinally when said strap is deflected under the weight of the rider to put said spring under stress.

8. A seat-support for implements, comprising an inclined strap secured at its lower end, a spring, and means yieldingly held at its lower end by said spring and connected at its upper end with said strap and movable outwardly longitudinally when said strap is deflected under the weight of the rider to compress said spring.

9. A seat-support for implements, comprising a strap suitably supported at its lower end, a spring, means supporting said spring, and means connected at its upper end with said strap and at its lower end with said spring and movable outwardly longitudinally when said strap is deflected under the weight of the rider to compress said spring.

CARL CHRISTENSEN.

Witnesses:
WM. R. BOND,
T. N. MAMS.